No. 833,338. PATENTED OCT. 16, 1906.
W. H. REEVES.
DRAFT EVENER.
APPLICATION FILED MAY 10, 1905.
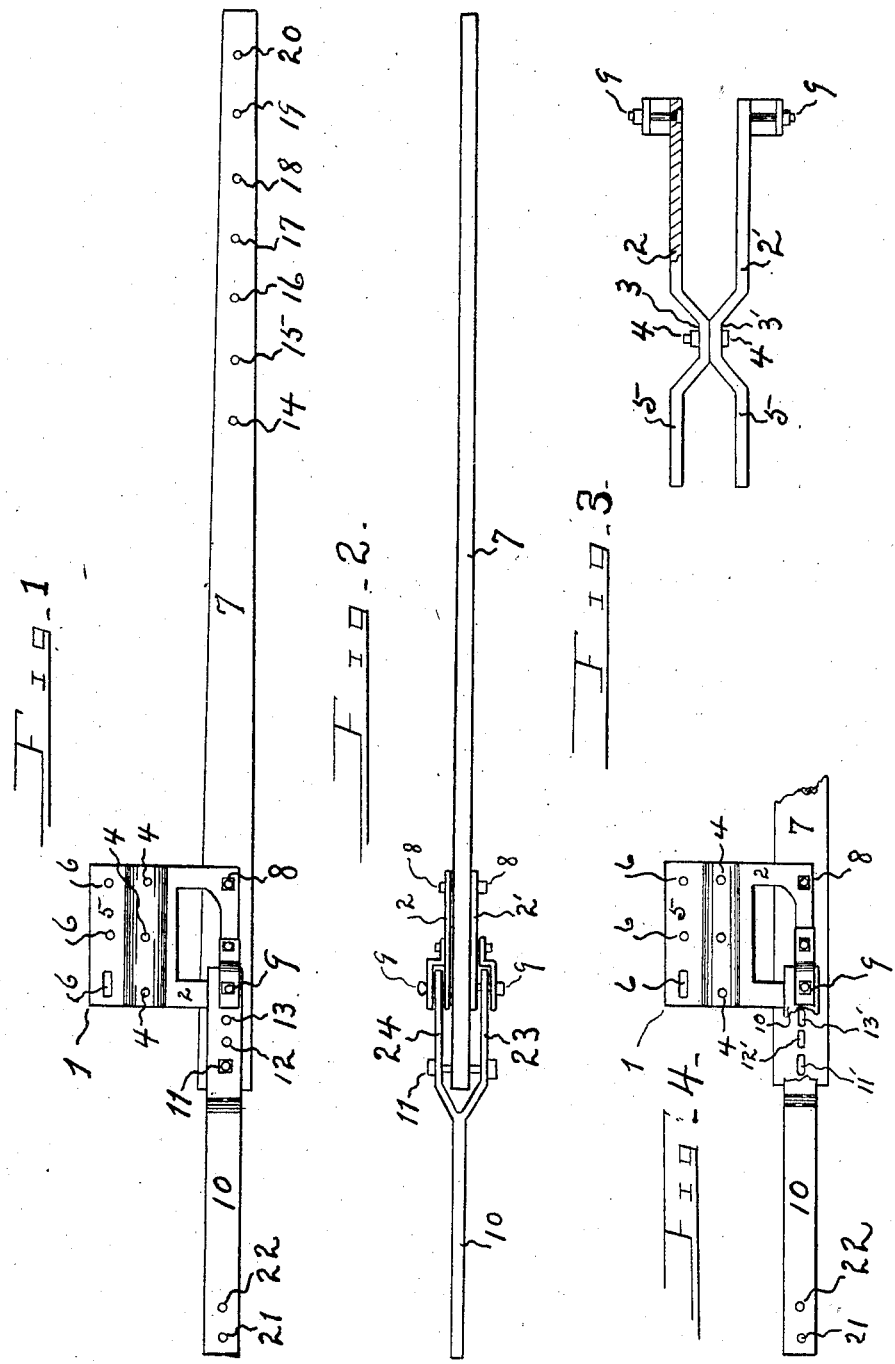
Witnesses
B. R. Ball.
C. A. Brouwer.
Inventor
William H. Reeves,
By Hiram A. Sturges, Attorney
THE NORRIS PETERS CO., WASHINGTON, D. C.

UNITED STATES PATENT OFFICE.

WILLIAM H. REEVES, OF EMERICK, NEBRASKA.

DRAFT-EVENER.

No. 833,338.　　　Specification of Letters Patent.　　　Patented Oct. 16, 1906.

Application filed May 10, 1905. Serial No. 259,660.

*To all whom it may concern:*

Be it known that I, WILLIAM H. REEVES, a citizen of the United States, residing at Emerick, in the county of Madison and State of Nebraska, have invented certain new and useful Improvements in Eveners for Gang-Plows or Similar Purposes, of which the following is a specification.

My invention relates to improvements in eveners for gang-plows or similar purpose, and has reference to a means during the operation of plowing for allowing all of the horses to walk upon unplowed land except the "furrow-horse" and to provide for adjustments to allow three, four, five, or more horses to be employed at the same time, also to provide for an intermediate clevis member adapted to connect the evener to a rigidly-disposed plow-clevis and adapted to bear two separate weight-supports for the evener.

With these objects in view my invention consists of novel construction and arrangement of parts, substantially as herein described, and illustrated by the drawings, wherein—

Figure 1 represents a plan view of my invention. Fig. 2 is a front view, and Fig. 3 is a side view, of the clevis member with a part in section. Fig. 4 is a detail of Fig. 1 to disclose slots in lever 7.

I construct the clevis member 1, composed of the adjacently-disposed and parallel plates 2 and 2', with the depressed portion at 3 and 3' bolted together at 4. The plates as thus joined present the arms 5 and the openings 6 therein, through which bolts may be passed to make an attachment with a plow-clevis. The arms 2 and 2' are adapted to receive the lever 7, which is pivotally hung therein by means of the bolt 8 and is adapted upon this bearing within these arms to have a limited horizontal swinging movement. I construct and place upon the clevis member pivotally hung at 9 the lever 10, so that it is free to have a slight horizontal swing subject to its contact with the lever 7 by means of the bolt connection at 11 or at 12 or at 13. Upon the lever 7 I provide a series of openings 14, 15, 16, 17, 18, 19, and 20, adapted to receive bolts to connect a swingletree or doubletree to which one, two, or more horses may be attached to move the gang of plows, and upon the free end of the lever 10 I construct the openings 21 and 22, through either of which an axletree may be connected.

The lever 10 consists of two parallel arms 23 and 24, which overlap that portion of the lever 7, the latter always being disposed between these arms and always has pivotal connection with lever 10 at one of the openings 11, 12, or 13 through elongated slots 11', 12', or 13', formed in lever 7. As thus constructed a fulcrum is provided for the lever 10 by means of the bearings at 11, 12, or 13 upon the lever 7. The lever 7 is provided with a fulcrum from the same source. The pivot-bolt 8 connects the entire weight to the lever 7. The pivot-bolt 9 is simply a bearing upon the clevis member upon the lever 10, so that the power applied to the last-named lever at 21 or 22 causes the short end of the lever 7 to be forced forward in a direction in advance of the clevis member and at the instant of applying this force also exerts an opposite or backward force upon the clevis member at the bearing 9, thereby causing the weight to be applied upon the bearing 8 of the clevis member with the lever 7, and in this manner the power applied upon the lever 10 becomes effective in overcoming the weight.

It is obvious that if the bolt is now used through the opening 12 instead of 11 or at 13 the distance of the fulcrum to the weight for the lever 10 is reduced, and an equal power applied at 21 or 22 causes a greater share of weight to be distributed upon the lever 7 than before the change, and this distribution of the weight upon the lever 10 will be in proportion to the selected distance of the fulcrum-openings 11, 12, or 13 from the pivotal weight-sustaining bearing 8, and this is a desired effect, since it requires the use of one horse only upon any disturbed portion of the ground, as will presently be pointed out.

The lever 7 is constructed of any desired length. It has a constant pivotal bearing between the arms of the clevis member at 8, its opposite end being under control of any force coming upon it by reason of the lever 10 exerting a force upon the fulcrum 11, 12, or 13, as already explained. The lever 7 receives the weight which has been distributed to it by the lever 10, but by reason of the power being applied at a point near its extreme free end the distance between such point of applied power is so much greater from its fulcrum in proportion to the distance from its fulcrum and the weight that this weight is equalized. This is a desired object, since it allows the travel of the horses to be upon the solid and unplowed portion of the ground.

In my invention I find it convenient to cause a space of only twelve inches to intervene between the openings 11 and 21 of the short lever and of four inches between openings 11 and 9, and I cause a spacing of two inches to intervene between the openings 11 and 12 and the same between 12 and 13, and I employ a spacing of one and one-half inches between the openings 21 and 22. A clevis is used at the opening 21 for attachment of an axletree, and the opening 22 is used for the same purpose whenever a graduated power is desired. The series of openings 14 to 20, inclusive, through the long lever are conveniently spaced, and for this lever I use a total length of five feet and six inches.

In the use of my invention I can use as many as five or six horses for operating a gang-plow, the width of the furrow being from sixteen to twenty inches. The furrow is thrown in a direction from the clevis member toward the free end of the short lever, and the "off" horse always travels in the furrow-ditch. All of the other horses travel upon the unplowed soil.

It is apparent that the use of the clevis member is of such construction that it is competent to withstand the great strain brought to bear upon its parts by the action of the levers, but since it is constructed by joining separate parts repair parts are economically made and the repairing of the clevis member is therefore a matter of small expense.

My invention may be employed to advantage upon reaping or other machines requiring heavy draft, as well as upon breaking, gang, or other plows, and it is evident that various changes of construction in the minor details may be made without departing from the invention, its scope being determined by its claim.

What I claim as my invention is—

In combination with a clevis member, a transversely-extending lever pivoted at unequal distances from its ends to the clevis member, and extending laterally beyond the walls of said clevis member; a second lever disposed adjacently to and parallel with said first lever and pivoted at unequal distances from its ends to the lesser end of said first lever, and pivoted upon said clevis member at a point between and in substantial alinement with said pivoted centers, said clevis member being composed of two plates, disposed parallel and adjacent, and depressed to form a mutually-approaching central transverse groove, forming a pair of parallel and laterally-disposed arms adapted to overlap one of said levers, and one similar pair of oppositely-disposed overlapping arms for holding means upon the object to be moved.

In testimony whereof I have affixed my signature in presence of two witnesses.

WILLIAM H. REEVES.

Witnesses:
C. E. McIntosh,
F. Quigley.